United States Patent [19]

Alexander et al.

[11] Patent Number: 5,784,184
[45] Date of Patent: Jul. 21, 1998

[54] WDM OPTICAL COMMUNICATION SYSTEMS WITH REMODULATORS AND REMODULATING CHANNEL SELECTORS

[75] Inventors: Stephen B. Alexander, Millersville; Steve W. Chaddick, Annapolis; Roy Litz, Freeland; Cecil D. Smith, Severna Park, all of Md.

[73] Assignee: CIENA Corporation, Linthicum, Md.

[21] Appl. No.: 668,746

[22] Filed: Jun. 24, 1996

Related U.S. Application Data

[63] Continuation-in-part of Ser. No. 624,269, Mar. 29, 1996, which is a continuation-in-part of Ser. No. 438,844, May 11, 1995, Pat. No. 5,504,609.
[51] Int. Cl.⁶ .................................................. H04J 14/02
[52] U.S. Cl. ........................ 359/125; 359/130; 359/133; 359/179; 371/20.2
[58] Field of Search ........................ 359/124–125, 359/130, 133, 174, 176, 179; 371/20.2

[56] References Cited

U.S. PATENT DOCUMENTS

| 5,351,147 | 9/1994 | Frenkel | 359/124 |
| 5,483,372 | 1/1996 | Green, Jr. | 359/179 |
| 5,504,609 | 4/1996 | Alexander et al. | 359/125 |
| 5,589,969 | 12/1996 | Taza et al. | 359/124 |

*Primary Examiner*—Kinfe-Michael Negash
*Attorney, Agent, or Firm*—Margaret Burke

[57] ABSTRACT

The present invention provides a WDM optical communication system with remodulators at the transmission input and remodulating channel selectors adjacent the optical receivers, providing complete control over the interfaces with optical transmission equipment. In an exemplary embodiment, the WDM system includes optical transmitters which input transmitted optical signals into optical remodulators. The optical remodulators place the information from each of the transmitted signals onto separate optical channels in the WDM system channel plan. The optical channels are multiplexed onto an optical waveguide. At the receive end, remodulating channel selectors each receive a portion of the WDM optical signal, select a particular optical channel, and place the information from the selected channel onto a newly-generated optical signal. This newly-generated optical signal is output to a receiver or to a further WDM optical system.

6 Claims, 3 Drawing Sheets

WDM OPTICAL COMMUNICATION SYSTEMS WITH REMODULATORS AND REMODULATING CHANNEL SELECTORS

CROSS REFERENCE TO RELATED APPLICATIONS

This application is a continuation-in-part of U.S. patent application Ser. No. 08/624,269, filed Mar. 29, 1996, which is a continuation-in-part of U.S. patent application Ser. No. 08/438,844, filed May 11, 1995, now U.S. Pat. No. 5,504,609, issued Apr. 2, 1996, the disclosures of which are incorporated by reference herein.

FIELD OF THE INVENTION

The invention relates to wavelength division multiplexed optical communications generally and, more particularly, to remodulating channel selectors for selecting a particular channel wavelength and placing the information from that channel wavelength onto a newly generated optical channel.

BACKGROUND OF THE INVENTION

Optical communication systems are a substantial and fast-growing constituent of communication networks. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems*, (Prentice Hall, N.Y.) c. 1993, the disclosure of which is incorporated herein by reference. Currently, the majority of optical communication systems are configured to carry an optical channel of a single wavelength over one or more optical waveguides. To convey information from plural sources, time-division multiplexing is frequently employed (TDM). In time-division multiplexing, a particular time slot is assigned to each signal source, the complete signal being constructed from the portions of the signals collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. In a WDM system, plural optical signal channels are carried over a single waveguide, each channel being assigned a particular wavelength. Through the use of optical amplifiers, such as doped fiber amplifiers, plural optical channels are directly amplified simultaneously, facilitating the use of WDM systems in long-distance optical networks.

To provide compatibility of WDM systems with existing networks, it is desirable to convert a signal from a received transmission wavelength from a customer to a specific channel wavelength within the WDM system. This is particularly true in WDM systems employing many channels, often referred to as "dense" WDM, where channel spacings are on the order of one nanometer or less. Such WDM systems require precise control of the optical signal wavelength for each channel in order to avoid "crosstalk," i.e., interference between adjacent channels. A WDM optical system for converting signals from received transmission wavelengths to specific channel wavelengths using optical remodulators is described in U.S. Pat. No. 5,504,609. A WDM optical system which uses both remodulators and diverse optical sources (e.g., to accommodate signals which are generated at the proper channel wavelength or optical channels being routed from another optical path) is described in parent application Ser. No. 08/624,269, the disclosure of which is incorporated by reference, above.

While both the described approaches advantageously offer compatibility with existing optical communication systems, particularly those systems using SONET terminal receivers which conform to the SONET "long-haul" standard, i.e., terminals configured to detect low optical signal levels, it would be desirable to provide an output channel signal conforming to SONET "short-reach" interface standards, i.e., terminals configured to detect higher-level optical signals.

Previously, attention has been focused on conversion of a single transmission channel from a wavelength outside the wavelength band amplified by optical amplifiers to a wavelength within the wavelength band amplified by optical amplifiers and then back to the original transmission wavelength for reception by an optical receiver. U.S. Pat. No. 5,267,073 describes wavelength conversion in a conventional single channel optical system to enable signal amplification by optical amplifiers. In the patent, an adapter is provided to receive a transmission optical signal having a wavelength which is outside the operating parameters of the optical amplifier. The signal is supplied to an optical-to-electronic converter module. The resultant electrical signal is output to an adjusting means comprising a laser piloting circuit for directly modulating a signal laser. The output of the signal laser is subsequently amplified by an optical amplifier. At the receive end, an adapter is provided to convert the optical signals from the amplifier into electrical signals which are fed to an adjustment module. The adjustment module comprises a laser piloting circuit which controls a laser transmitter. In this manner, the patent purports to avoid problems in which normal optical line receivers have problems with frequency response when they are coupled to optical amplifiers in optical fiber lines.

There is a need in the art for WDM optical communication systems which employ channel selectors which can both select a particular channel wavelength from a multiplexed optical signal and place the information from that channel onto a newly-generated optical signal, the optical signal selected to have the desired characteristics which make it compatible with the desired terminal receiver equipment. Such channel selectors would permit the use of less expensive terminal equipment, facilitating the use of wavelength division multiplexing in a greater variety of telecommunications applications.

SUMMARY OF THE INVENTION

The present invention provides a WDM optical communication system with remodulators at the transmission input and remodulating channel selectors adjacent the optical receivers, providing complete control over the interfaces with optical transmission equipment. In an exemplary embodiment, the WDM system includes optical transmitters which input transmitted optical signals into optical remodulators. The optical remodulators place the information from each of the transmitted signals onto separate optical channels in the WDM system channel plan. The optical channels are multiplexed onto an optical waveguide. At the receive end, remodulating channel selectors each receive a portion of the WDM optical signal, select a particular optical channel, and place the information from the selected channel onto a newly-generated optical signal. This newly-generated optical signal is output to a receiver or to a further WDM optical system.

DETAILED DESCRIPTION

Figure 1:
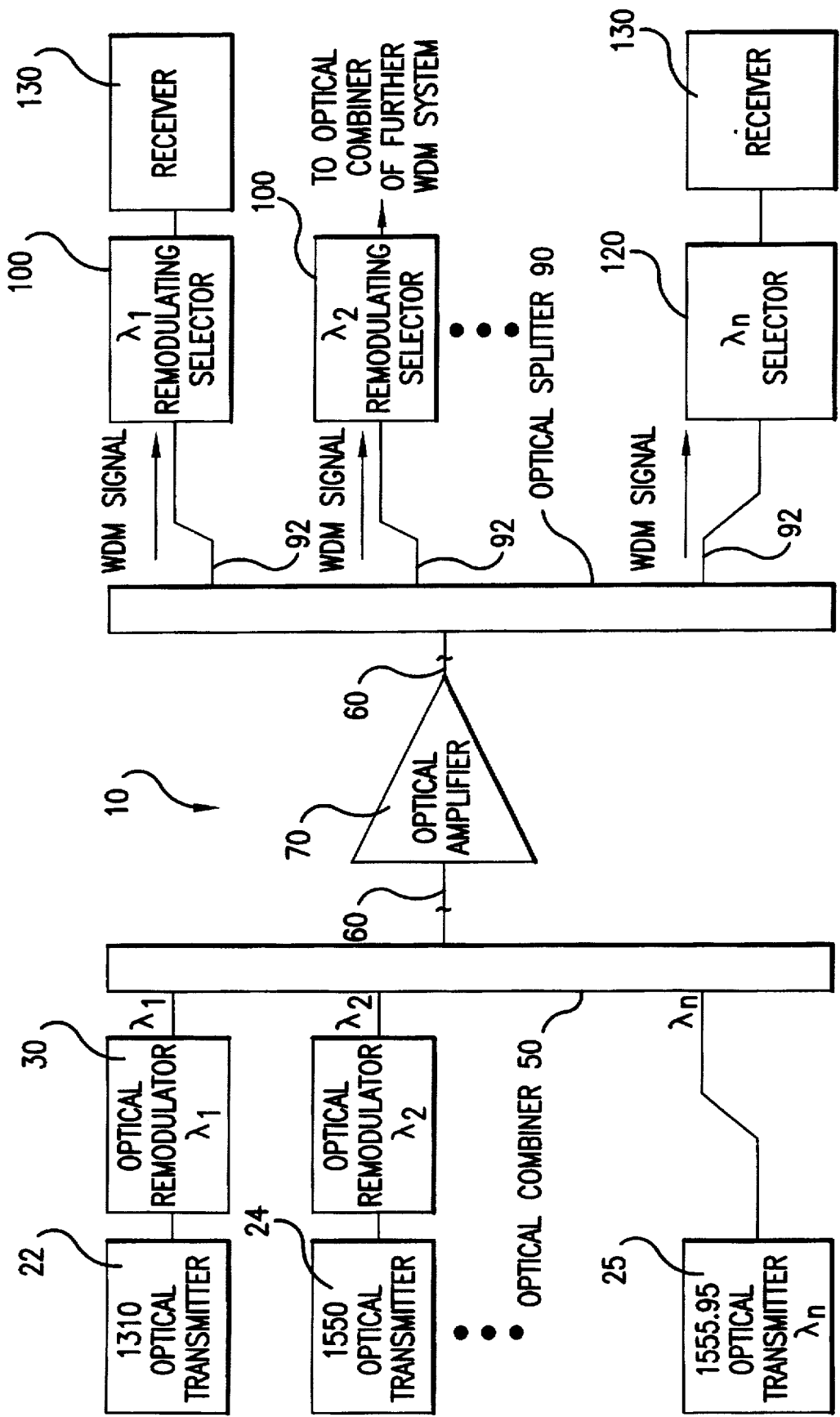
FIG. 1 schematically depicts an optical communication system employing remodulating channel selectors according to the present invention.

Turning to the drawings in detail in which like reference numerals indicate the same or similar elements in each of the several views, FIG. 1 depicts an optical communication system 10 according to an embodiment of the present invention. Optical communication system 10 operates to take optical transmission signals from diverse optical transmitters and other optical signal sources and map the signal sources onto a wavelength division optical communication system, i.e., a communication system in which individual optical signals correspond to optical channels within a wavelength division multiplexed optical signal carried on an optical waveguide. Optical communication system 10 includes a first set of one or more optical transmitters 22, 24, each optical transmitter emitting an information-bearing optical signal at a first transmission wavelength.

Optical transmitters 22 and 24 generally include a laser, such as a DFB semiconductor laser, and a modulator for creation of an information-bearing optical transmission signal. In an exemplary embodiment, optical transmitters 22 and 24 are SONET OC-48 transmitters. When plural optical transmitters are provided, the transmission wavelength of each transmitter can be the same or different. Because transmitters 22 and 24 may form part of an existing optical system, a wide variety of transmitters emitting in a broad range of wavelengths can be accommodated in the optical communication system of the present invention, thus ensuring compatibility with currently-deployed transmission equipment. Typical transmission elements emit wavelengths ranging from about 1300 to 1600 nm. Transmission elements in current optical communication systems and various optical modulation techniques employed therein are described in Gowar, *Optical Communication Systems*, incorporated by reference above. In the depicted exemplary embodiment, optical transmitter 22 is a 1310 nm optical transmitter and optical transmitter 24 is a 1550 optical transmitter, commercially available from NEC, Fujitsu, Alcatel, and Nortel.

Optical communication system 10 includes a plurality of remodulators 30 for receiving the transmitted information-bearing optical signal at transmission wavelength from the first set of optical transmitters and transmitting an information-bearing optical signal at a WDM optical system channel wavelength. The expression "information-bearing optical signal," as used herein, refers to an optical signal which has been coded with information, including, but not limited to, audio signals, video signals, and computer data, generally through modulation. Similarly, the expression "non-information-bearing optical signal," as used herein, relates to a CW (Continuous Wave) optical signal which has not been coded with information, e.g., an optical carrier which has not been modulated. Typically, the wavelengths emitted by the remodulators are selected to be within the 1500 nanometer range, the range in which the minimum signal attenuation occurs for silica-based fibers. More particularly, the wavelengths emitted by the remodulators are selected to be in the range from 1530 to 1560 nanometers. However, other wavelength bands may be selected according to overall system requirements.

For a 16-channel wavelength division multiplexed optical communication system, an exemplary channel plan is set forth in Table 1 below. The optical channel plan dictates both the wavelengths of the optical remodulators and the corresponding wavelengths selected by the wavelength selectors in the optical receiving systems.

TABLE 1

| Channel Number | Wavelength (nm) |
| --- | --- |
| 1 | 1557.36 |
| 2 | 1556.56 |
| 3 | 1555.75 |
| 4 | 1554.94 |
| 5 | 1554.13 |
| 6 | 1553.33 |
| 7 | 1552.52 |
| 8 | 1551.72 |
| 9 | 1550.92 |
| 10 | 1550.12 |
| 11 | 1549.32 |
| 12 | 1548.51 |
| 13 | 1547.72 |
| 14 | 1546.92 |
| 15 | 1546.12 |
| 16 | 1545.32 |

Wavelength division multiplexed topical communication system 10 optionally includes a second set of one or more optical transmitters 25 which directly output an optical signal having a wavelength which corresponds to an optical channel within the channel plan of the communication system. Consequently, optical transmitters 25 optically communicate with optical combiner 50 without the need for remodulation by remodulators 30. Optical transmitters 25 are commercially available from a variety of suppliers, including the OCT-204 series of optical transmitters from Alcatel, the HT2H-LR1H optical transmitters from Fujitsu, and the ITS-2400 optical transmitters from NEC.

Wavelength division multiplexed optical communication system 10 further optionally comprises additional sources of optical signals, e.g., optical signals from add/drop multiplexers or demultiplexers from other optical systems. Examples of various configurations of WDM optical systems with diverse signal sources are described in the parent application, incorporated by reference above.

Figure 2:
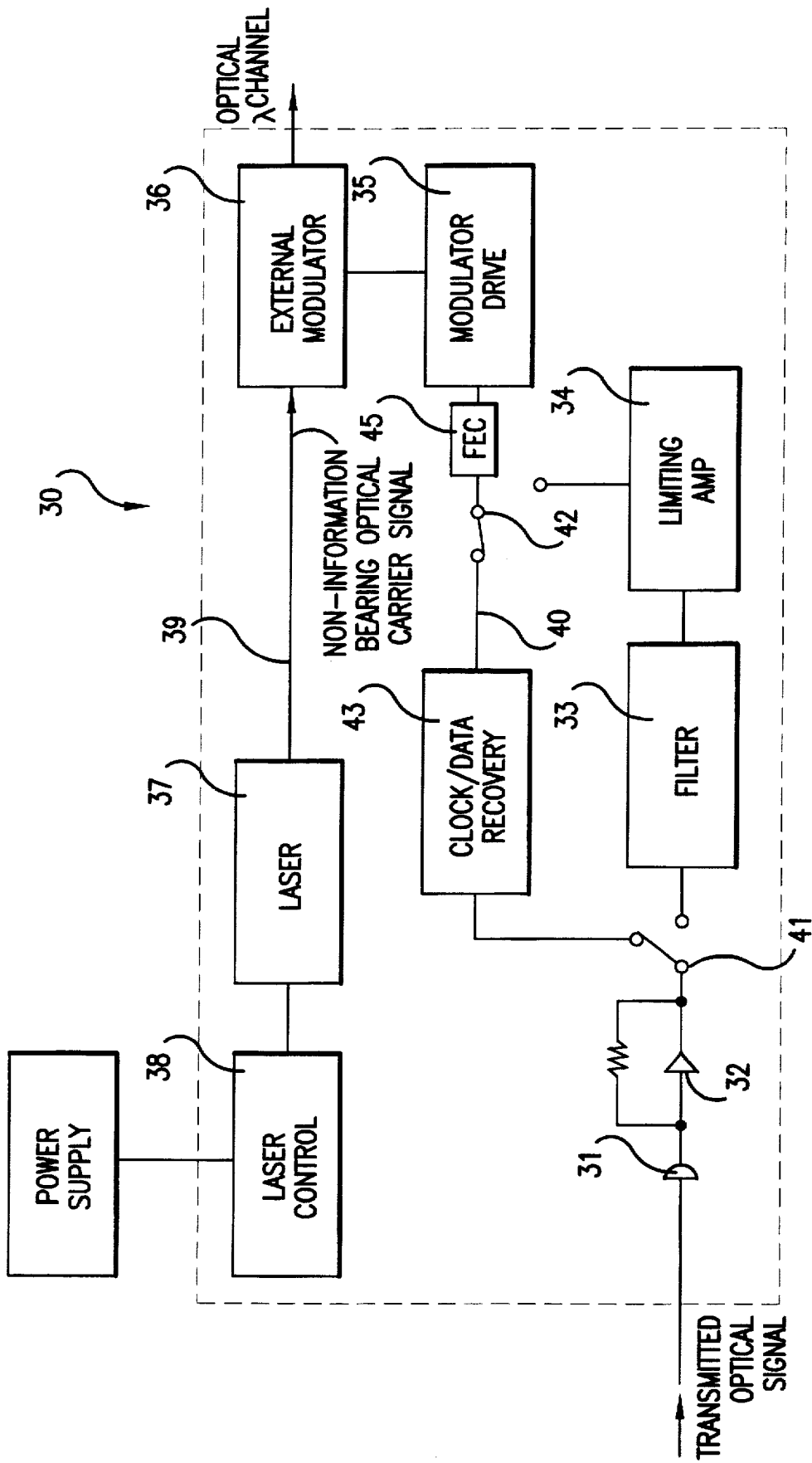
FIG. 2 schematically depicts a remodulator used in the optical communication system of FIG. 1.

An exemplary remodulator 30 for use in optical communication system 10 is schematically depicted in FIG. 2. In remodulator 30, the transmitted optical signal is converted by electro-optical converter 31, typically a photodiode, to an electrical signal. The electrical signal is amplified by transimpedance amplifier 32, passed through filter 33 to limit the noise bandwidth and waveshape the signal, and further amplified by limiting amplifier 34. Optionally, remodulator 30 can include clock and data recovery circuit 43 for use with high data rate signals. Switch 41 automatically selects high data rate signals and passes them through clock/data recovery element 43. The selected signals are retimed, advantageously reducing jitter. The retimed signal exits clock and data recovery circuit through switch 42.

The resultant electrical signal is used to drive external modulator 36 through modulator driver 37. As used herein, the expression "external modulator" includes any modulator which acts on an optical carrier emitted from a CW optical source, such as a laser. Such external modulators can be packaged with the optical source or packaged separately from the optical source.

Remodulator 30 also includes a optical source, such as laser 37, for delivering a non-information-bearing optical carrier signal to laser output waveguide 39. In an exemplary embodiment, laser 37 is a DFB semiconductor diode laser, generally comprising one or more III-V semiconductor materials, commercially available from a wide variety of suppliers such as Fujitsu, GEC Marconi, Alcatel, and Hewlett-Packard. The laser outputs an optical carrier signal at a particular channel wavelength, the wavelength corresponding to a channel selector wavelength included in the remodulating channel selector. Laser control 38 provides the required laser bias current as well as thermal control of the laser. Using thermal control, the precise operating wavelength of the laser is maintained, typically to within a one angstrom bandwidth.

External modulator 36 acts on the optical carrier signal output from laser 37, as opposed to acting on the laser itself or on a laser driver, as occurs in direct modulation systems. An exemplary external modulator employs a waveguiding medium whose refractive index changes according to the applied electrical field, i.e., a material exhibiting an electro-optic effect. Consequently, the phase of input optical carrier signals is altered as a result of the changing refractive index of the optical waveguide. A suitable electro-optic waveguiding material for the external modulators of the present invention is lithium niobate, $LiNbO_3$. An exemplary electro-optic modulator for use as external modulator 36 is a Mach-Zehnder interferometric modulator which provides high-speed intensity modulation of optical carriers. In the Mach-Zehnder configuration, two optical paths are provided. An incoming optical carrier is split between the two paths of the interferometer. At least one path of the interferometer is phase modulated. When the signal is recombined at the output, the light from the paths either constructively or destructively interferes, depending upon the electrical field applied to the surrounding electrodes during the travel time of the carrier, creating an amplitude-modulated output signal. Further details of electro-optic modulators are described in Becker, "Broad-Band Guided Wave Electrooptic Modulators," *IEEE Journal of Quantum Electronics*, Vol. QE-20, No. 7, July, 1984, pp. 723-727, the disclosure of which is incorporated by reference herein. Mach-Zehnder interferometers suitable for use in external electro-optic modulator 36 are commercially available from United Technologies, and IOC. The modulated output signal is the information-bearing optical channel whose wavelength corresponds to a particular channel selector wavelength in the optical communication system.

Alternatively, the external modulator employed in the remodulators of the present invention can be selected from electro-absorption external modulators. Electro-absorption modulators function by changing the bandgap of the modulating material to impart information to the optical carrier signal. Exemplary electro-absorption modulators are described in Wood, "Multiple Quantum Well (MQW) Waveguide Modulators," *Journal of Lightwave Technology*, Vol. 6, No. 6, June, 1988, pp. 743-757, the disclosure of which is incorporated by reference herein.

Optionally, remodulators 30 include forward error correction (FEC) encoders 45. The addition of forward error correction to a WDM optical communication system advantageously decreases the bit error rate (BER) by adding redundancy, e.g., coding bits, to the individual optical channels which comprise the WDM signal. In particular, the addition of FEC permits the WDM system to achieve substantially error-free performance in the presence of the nonlinearities present in optical communication system. At the receive end, a forward error correction decoder examines the coding bits to accurately reconstruct the transmitted information. A variety of coding algorithms may be used to accomplish forward error correction in the WDM optical systems of the present invention. Exemplary algorithms are convolutional encoding with threshold decoding, Viterbi decoding, or Reed-Solomon encoding/decoding. Detailed descriptions of these and other coding algorithms are found in Wiggert, *Error-Control Coding and Applications*, (Artech House, c. 1978), the disclosure of which is incorporated by reference herein.

Advantageously, forward error correction in the WDM optical systems of the present invention enables a "channel trace" function that encodes the channel ID, source, and destination into a small overhead bit stream which would permit the remodulating channel selector to respond only to an incoming signal with the proper addressing. The use of channel tracing through forward error correction additionally permits channel path trace through the WDM system, a particularly useful feature for complex system topologies and WDM systems with extensive add/drop multiplexing or cross-connect features.

Each information-bearing optical signal produced by a remodulator constitutes a channel in optical system 10, the wavelength of which corresponds to a channel selector wavelength. The optical signal channels output from remodulators 30 are brought together in optical combiner 50 for conveyance to optical waveguide 60. Optical combiner 50 is selected from any passive optical component which can combine plural wavelengths into a single output medium. Frequently, optical splitters used to divide a signal among plural outputs are used as optical combiners, operated in reverse fashion from the splitter. Exemplary optical combiners include 1×N passive splitters available from Corning, Inc., Corning, N.Y., 1×N wideband single mode splitters available from IOT Integrierte Optik GmbH, Waghausel-Kirrlach, Germany, and fused fiber combiners available from Gould, Inc., Millersville, Md. The combination of channels forms a multiplexed optical signal which is output to waveguide 60. Optical waveguide 60 is typically a single-mode optical fiber such as SMF-28, available from Corning, and TRUEWAVE, available from AT&T Corp./Lucent Technologies, and is the principal transmission medium for the optical communication system. However, any optical waveguide which is capable of transporting multiple optical wavelengths can be employed as waveguide 60 in optical system 10.

Interposed along optical waveguide 60 are one or more optical amplifiers 70. Optical amplifiers 70 are selected from any device which directly increases the strength of plural optical signals without the need for optical-to-electrical conversion. In general, optical amplifiers 70 are selected from optical waveguides doped with rare earth ions such as erbium, neodymium, praseodymium, ytterbium, or mixtures thereof. Optical amplifiers, their materials, and their operation are further described in Gowar, Ed. *Optical Communication Systems*, incorporated by reference above and in Desurvire, *Erbium-Doped Fiber Amplifiers*, (John Wiley & Sons, Inc., N.Y.), c. 1994, the disclosures of which are incorporated by reference herein. Exemplary optical amplifier configurations are described in the parent applications, the disclosures of which are incorporated by reference. Further descriptions of doped-fiber optical amplifier configurations suitable for use in the optical communication system of the present invention are described in Bjarklev, *Optical Fiber Amplifiers: Design and System Applications*, (Artech House, Norwood, Mass.) c. 1993, the disclosure of which is incorporated herein by reference.

Following transmission and amplification of the multiplexed optical signals along waveguide 60, a portion of the multiplexed optical signal must be sent to each of the remodulating channel selectors for selection and routing to an appropriate optical receiver. The multiplexed signal is input to optical splitter 90 which places a portion of the multiplexed signal onto plural output paths 92. Each output path 92 optically communicates with a remodulation channel selector 100. Optical splitter 90 is selected from any optical device which can divide an input optical signal and place it onto plural output paths. Exemplary splitters include passive optical components such as those components described for use as optical combiner 50.

Figure 3:
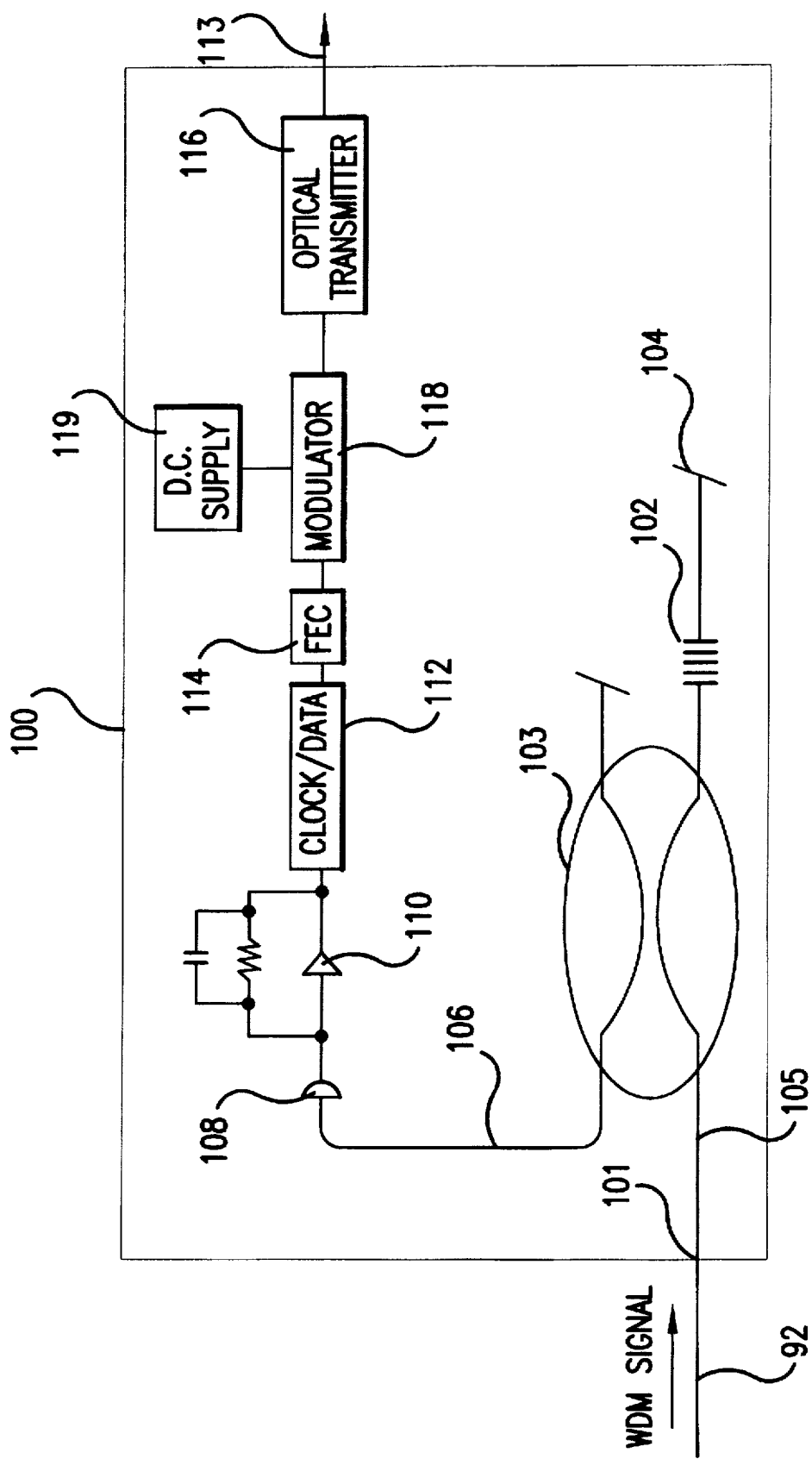
FIG. 3 schematically depicts a remodulating channel selector used in the optical communication system of FIG. 1.

FIG. 3 schematically depicts an exemplary remodulating channel selector 100 for use in WDM optical communication system 10. Remodulating channel selector 100 includes an optical input port 101 for receiving the WDM optical signal from splitter output path 92. The WDM optical signal traverses optical path 105 through splitter 103 to channel selector 102. Channel selector 102 passes optical signals having wavelengths other than the channel wavelength to be processed by the remodulating channel selector. These non-selected channels pass through low reflectivity port 104 and exit the optical communication system. The low reflectivity port 104 may be an angled fiber cut, although any low reflectivity waveguide termination technique may be employed. The selected channel wavelength is reflected by channel selector 102 through splitter 103 onto optical path 106. In an exemplary embodiment, optical splitter 103 is a fused fiber coupler and channel selector 102 comprises a Bragg grating member configured to reflect the selected channel wavelength. Preferably, the Bragg grating comprises a series of photoinduced refractive index perturbations in an optical fiber which causes the reflection of optical signals within a selected wavelength band. Bragg gratings suitable for use in the optical system of the present invention are described in Morey et al., "Photoinduced Bragg Gratings in Optical Fibers," *Optics and Photonics News*, February 1994, pp. 8–14, the disclosure of which is incorporated by reference herein.

Although a Bragg grating is depicted as the channel selecting element, it is understood that numerous other optical components can be employed as channel selector 102. Such optical components include, but are not limited to, multilayer interference filters, tunable Fabry-Perot selectors, and wavelength routers. In an exemplary embodiment, the optical bandwidth is selected to be sufficiently narrow to minimize the deleterious effects of amplified spontaneous emission (ASE).

The selected optical channel is converted by electro-optical converter 108, typically a photodiode, to an electrical signal. The electrical signal is amplified by transimpedance amplifier 110 and routed through clock and data recovery circuit 112 for retiming. In an exemplary embodiment, the electrical bandwidth of the optical-to-electrical converter and the transimpedance amplifier is selected to match the data rate of the incoming signal. Optionally, the remodulating channel selector includes forward error correction decoder 114 for accurate reconstruction of the transmitted signal, as discussed above.

The resultant signal is used to modulate the optical emitter of optical transmitter 116. Optical transmitter 116 is selected from a variety of optical devices, depending upon the optical interface required for receiver 130. When the signal emitted by the remodulating channel selector is destined for long distance transmission (e.g., through the optical combiner of a further WDM optical system as depicted in FIG. 1), the optical emitter is selected to be a DFB laser. When the signal emitted by the remodulating channel selector is destined for an adjacent receiver, the optical emitter within the optical transmitter is selected from lower-cost, shorter-range optical emitters such as Fabry-Perot lasers, light-emitting diodes, and superluminescent diodes.

The wavelength of the optical emitter employed in optical transmitter 116 can be the same wavelength as the wavelength of the optical channel selected by the particular channel selector or it can be a different wavelength. When the optical channel is output directly to a receiver, the wavelength of the optical signal is not critical. In such an embodiment, the same wavelength can be output by all of the optical transmitters 116. Since an optical signal being output directly to an optical receiver need not be optically amplified, the optical emitter can be selected to have any wavelength detectable by the optical receiver (e.g., a wavelength outside the gain band of rare-earth doped fiber amplifiers such as 1310 nm). However, if the optical signal emitted by the remodulating channel selector is destined for transmission in the same or another WDM system, then the wavelength of the optical emitter is selected to be compatible with the channel plan of that system. For example, the optical emitter may create a signal having the same wavelength as the selected optical signal, or it may produce an optical signal having a wavelength which corresponds to another channel from the input WDM optical signal. If the remodulating channel selectors are incorporated into a switching matrix, a variable wavelength optical emitter can be used to dynamically select an available wavelength within a WDM optical channel plan.

FIG. 3 depicts direct modulation of optical transmitter 116. Although "modulator" 118 is depicted as a discrete device, in actuality it can consist of d.c. power supply 119 interconnected with an electronic switch. The electronic switch in turn optically communicates with the electrical signal containing the information from the selected channel output through the optical-to-electrical converter and processed by the subsequent elements. The electronic switch controls the flow of current from the d.c. supply to the optical emitter in response to the information received from the electrical signal. Alternatively, the direct modulation of the emitter can be performed using a voltage-controlled current source for the elements labeled 118 and 119 in FIG. 3. Such a current source for the optical emitter provides a current whose magnitude is directly related to the applied voltage. The applied voltage represents the information received from the optical-to-electrical converter; alternatively the current may be directly derived from the modulating voltage.

In an alternate embodiment (not shown) the optical signal emitter is externally modulated, e.g., as in the remodulators of FIG. 2. External modulation is particularly advantageous when the signal output by the remodulating channel selector is destined for long-distance transmission. In such an embodiment, the remodulating channel selectors can serve to reshape and retime an optical signal, e.g., an optical signal which has traversed the maximum dispersion-limited transmission distance (e.g., a distance of approximately 600 km for optical fibers such as SMF-28).

In this manner, a modulated optical signal is output by optical transmitter 116 through remodulating channel selector output port 113. The remodulating channel selector output signal is transmitted to optical receiver 130. Receiver 130 generally detects the optical signal and converts it to an electrical signal, typically through the use of a photodiode device. Various optical receivers suitable for use in optical system 10 are described in Gowar, *Optical Communication Systems*, discussed above. In optical communication system 10, receiver 130 will frequently be part of an existing optical communication system to which the remodulated optical signal is routed. Consequently, the optical system 10 can function with numerous types of receivers to ensure compatibility with existing optical equipment. In particular, the presence of remodulating channel selectors 100 enables the WDM optical communication system to communicate with optical receivers conforming to the SONET "short-haul" standard. Further descriptions of SONET interface standards are found in *SONET Transport Systems: Common Criteria*, (GR-253-CORE, Issue 1, December, 1994), the disclosure of which is incorporated by reference herein.

Alternatively, as depicted in FIG. 1, the output of a remodulating channel selector is conveyed to another WDM optical system or a portion of the same WDM optical system through input to an optical combiner for multiplexing with other optical signals or routing, e.g., through an add/drop multiplexer.

Optionally, channel selectors 120 are provided for selecting an optical channel from an input WDM optical signal. Such channel selectors, described in more detail in the parent applications incorporated by reference above, select an optical channel and directly output the selected channel without remodulation. Such channel selectors are used particularly when the optical receivers with which they communicate conform to the SONET "long-haul" standard. Such "non-remodulating" channel selectors can also route their selected optical channels to an optical combiner for further transmission in the same WDM optical system or in a different WDM optical system.

While the foregoing invention has been described in terms of the embodiments discussed above, numerous variations are possible. Accordingly, modifications and changes such as those suggested above, but not limited thereto, are considered to be within the scope of following claims.

What is claimed is:

1. A wavelength division multiplexed optical communication system for transmitting a plurality of optical communication channels on an optical waveguide, each optical communication channel having a distinct channel wavelength, the optical communication system comprising:

a plurality of optical transmitters, each optical transmitter transmitting an information-bearing optical signal having a transmission wavelength;

a plurality of remodulators optically communicating with the plurality of optical transmitters for converting the transmitted information-bearing optical signal to an electrical signal and placing the information from each of the information-bearing optical signals onto separate optical channels in the wavelength division multiplexed optical communication system;

an optical combining element optically communicating with said plurality of remodulators for combining said separate optical channels, each having a unique wavelength, to form a wavelength division multiplexed optical communication signal;

an optical waveguide optically communicating with each of the remodulators through said optical combining element, said optical waveguide receiving the wavelength division multiplexed optical signal from said combining element;

a plurality of remodulating channel selectors optically communicating with the optical waveguide, each remodulating channel selector comprising:

an optical input port for receiving the wavelength division multiplexed optical communication signal from the optical waveguide;

a channel selecting element optically communicating with the optical input port for selecting a particular optical channel from the wavelength division multiplexed optical communication signal;

an optical signal generator;

means for placing the information from the selected optical channel onto an optical signal generated by the optical signal generator; and an output port for outputting the optical signal generated by the optical signal generator; and a plurality of optical receivers optically communicating with the output ports of the remodulating channel selectors such that each optical receiver receives an optical signal from a remodulating channel selector.

2. A wavelength division multiplexed optical communication system as recited in claim 1 wherein the means for placing the information from the selected optical channel onto an optical signal generated by the optical signal generator comprises an optical-to-electrical converter for producing an electrical signal which communicates with modulating means for the optical signal generator.

3. A wavelength division multiplexed optical communication system as recited in claim 1 further comprising forward error correction encoders in the remodulators and forward error correction decoders in the remodulating channel selectors.

4. A wavelength division multiplexed optical communication system as recited in claim 1 wherein the channel-selecting element includes a Bragg grating.

5. A wavelength division multiplexed optical communication system as recited in claim 1 wherein the remodulating channel selector optical signal generator is a laser.

6. A wavelength division multiplexed optical communication system as recited in claim 3 wherein the forward error correction encoder adds overhead bit streams to the optical channel for channel identification.

* * * * *